United States Patent [19]
Klein

[11] Patent Number: 6,106,566
[45] Date of Patent: Aug. 22, 2000

[54] UPGRADABLE ELECTRONIC MODULE AND SYSTEM USING SAME

[75] Inventor: Dean A. Klein, Eagle, Id.

[73] Assignee: Micron Electronics, Inc., Nampa, Id.

[21] Appl. No.: 09/015,855

[22] Filed: Jan. 29, 1998

[51] Int. Cl.⁷ .............................. G06F 9/455; G06F 13/12
[52] U.S. Cl. .............................. 703/27; 703/25; 710/129; 710/131
[58] Field of Search ................................. 710/102, 15, 22, 710/126; 395/309, 500.16, 281; 345/520; 703/24, 25, 27; 714/44, 24

[56] References Cited

U.S. PATENT DOCUMENTS

| | | |
|---|---|---|
| 4,214,302 | 7/1980 | Schmidt . |
| 5,675,772 | 10/1997 | Liu et al. .................................. 395/500 |
| 5,748,912 | 5/1998 | Lee .......................................... 710/102 |
| 5,772,474 | 6/1998 | Yagi et al. ............................... 439/660 |
| 5,802,269 | 9/1998 | Poisner et al. ........................ 395/183.2 |
| 5,857,086 | 1/1999 | Horan et al. ............................. 395/309 |
| 5,872,998 | 2/1999 | Chee ........................................ 395/876 |
| 5,983,297 | 11/1999 | Noble et al. ............................. 710/102 |
| 6,044,427 | 3/2000 | Klein ........................................ 710/127 |

OTHER PUBLICATIONS

Extract of Figure 1 from INTEL Pentium Processor with MMX Technology Mobile Module.
Extract of Figures 1 and 2 from INTEL Pentium II Processor with On–Die Cache Mobile Module MMC–2.

*Primary Examiner*—Kevin J. Teska
*Assistant Examiner*—Lonnie A. Knox
*Attorney, Agent, or Firm*—Dorsey & Whitney LLP

[57] ABSTRACT

An upgradable Pentium-based mobile processor module that is forward-compatible with an enhanced Pentium II-based mobile processor module. The upgradable Pentium-based mobile processor module uses 0.5 millimeter pitch connection technology and contains a system controller that supports a single peripheral component interconnect port. The upgradable Pentium-based mobile processor module provides a PCI port for connection to a PCI bus and an AGP port for connection to an AGP bus. The AGP port is electronically connected to the PCI port so that both the AGP port and the PCI port receive data and control signals from the system controller according to the PCI protocol standard.

12 Claims, 4 Drawing Sheets

UPGRADABLE ELECTRONIC MODULE AND SYSTEM USING SAME

TECHNICAL FIELD

The present invention relates to electronic modules and, in particular, to upgradable electronic modules that are forward compatible with future electronic modules having enhanced components and enhanced connectivity.

BACKGROUND OF THE INVENTION

A mobile processor module ("MPM") is a multi-component device that plugs into a PC motherboard. Conventional MPMs contain a voltage regulator, a central processing unit ("CPU"), a cache, and a system controller.

FIG. 1 shows an architecture block diagram of an MPM produced by the Intel Corporation. This MPM 101 contains a Pentium® processor 102, a L2 cache SRAM 103, a tag RAM 104, a voltage regulator 105, and a MCTX "North Bridge" system controller 106. This MPM interfaces to DRAM memory 107 via a memory bus 108 and to other devices within the PC system via a port 114 to PCI bus 109. An internal CPU bus 113 connects the CPU 102, cache SRAM 103, and system controller 106. Other devices coupled to the PCI bus 113 may include a PCI-ISA bridge 110, a video graphics accelerator ("VGA") controller 111, and other PCI-compatible system components 112. The PCI bus 109 in current systems generally runs at a clock speed of 33 MHz. The structure and operation of the above-described components are conventional. Therefore, an explanation of their structure and operation will be omitted in the interest of brevity.

VGA controllers are currently available that can run either at a clock speed of 33 MHz or a clock speed of 66 MHz. Increased clock speeds for VGA controllers result in increased rate of data transfer from a MPM 101 to a VGA display monitor controlled by the faster VGA controller 111. Increased data transfer rates are important for enhanced multimedia computer applications and graphical user interfaces that display detailed animation and real-time video images.

In order to take a better advantage of VGA controllers that run at higher clock speeds, as well as to take advantage of the increased performance and capabilities of the Pentium® II processor, Intel may produce an enhanced MPM that will be herein referred to as a model MDM-A MPM. FIG. 2 shows an architecture block diagram of the Intel MDM-A enhanced MPM. Many of the components shown in FIG. 2 are identical to components shown in FIG. 1. Thus, in the interest of brevity, those components of FIG. 2 that are identical to components in FIG. 1 have been provided with the same reference numerals as in FIG. 1, and an explanation of their operation will not be repeated. The MDM-A 201 contains a cache SRAM 202, a Pentium® II CPU 203, a voltage regulator 204, and an Intel 440 BX "North Bridge" system controller 205. The system controller 205 is connected to DRAM memory 107 via a memory bus 108. The system controller 205 has two ports 213 and 214 for coupling to external devices. As in the MPM 101 shown in FIG. 1, most PCI-compatible devices 112 and a PCI-ISA bridge 110 are connected to the system controller 205 via a PCI bus 109. This PCI bus 109 runs at 33 MHz. Unlike the MPM 101 shown in FIG. 1, the MDM-A system controller 205 has a second port 214 coupled to an advanced graphics processor ("AGP") bus 211 that connects the system controller 205 to the VGA controller 111. The AGP bus 211 employs a data transfer protocol that is a superset of the PCI bus protocol. The AGP bus 211 runs at a clock speed of 66 MHz. The MDM-A 201 is thus able to take advantage of the higher clock rates of 66 MHz VGA controllers and includes the faster and more capable Pentium® II CPU.

The currently-available Intel MPM 101 shown in FIG. 1 is connected to the system with a 0.8 millimeter pitch connector. The MDM-A 201 will be connected to systems with a 0.5 millimeter pitch connector which increases the number of available connector pins in order to accommodate a second port 215 from the MPM-A 201 to the AGP bus 211.

Personal computer ("PC") manufacturers prefer to develop upgradable PCs that can accommodate new, enhanced components when these components become available. Although the MDM-A device 201 is not currently available, it is desirable for PC manufacturers to produce a PC incorporating the currently-available MPM 101 shown in FIG. 1 that can be, in the future, upgraded by replacing the MPM 101 with an MDM-A 201 shown in FIG. 2. However, because the MDM-A 201 includes additional pins for the second AGP port 215, and because the VGA controller 111 is connected via the AGP bus 211 rather than via the PCI bus 109, the PC system shown in FIG. 1 is not compatible with the MDM-A 201 shown in FIG. 2. A need has therefore been recognized for an upgradable MPM that incorporates the components of the MPM 101 shown in FIG. 1, but is compatible with, and can be replaced by, the MDM-A 201 shown in FIG. 2.

SUMMARY OF THE INVENTION

The present invention provides an upgradable Pentium®-based MPM that is forward-compatible with an enhanced Pentium® II-based MPM that uses 0.5 millimeter pitch connection technology and that has both a PCI port for connection to a PCI bus and an AGP port for connection to an AGP bus. The upgradable Pentium®-based MPM uses 0.5 millimeter pitch connection technology and contains a system controller that supports a single PCI port. The upgradable Pentium®-based MPM provides a PCI port for connection to a PCI bus and an AGP port for connection to an AGP bus. The AGP port is electronically connected to the PCI port so that both the AGP port and the PCI port receive data and control signals from the system controller according to the PCI protocol standard.

DETAILED DESCRIPTION OF THE INVENTION

Figure 1:
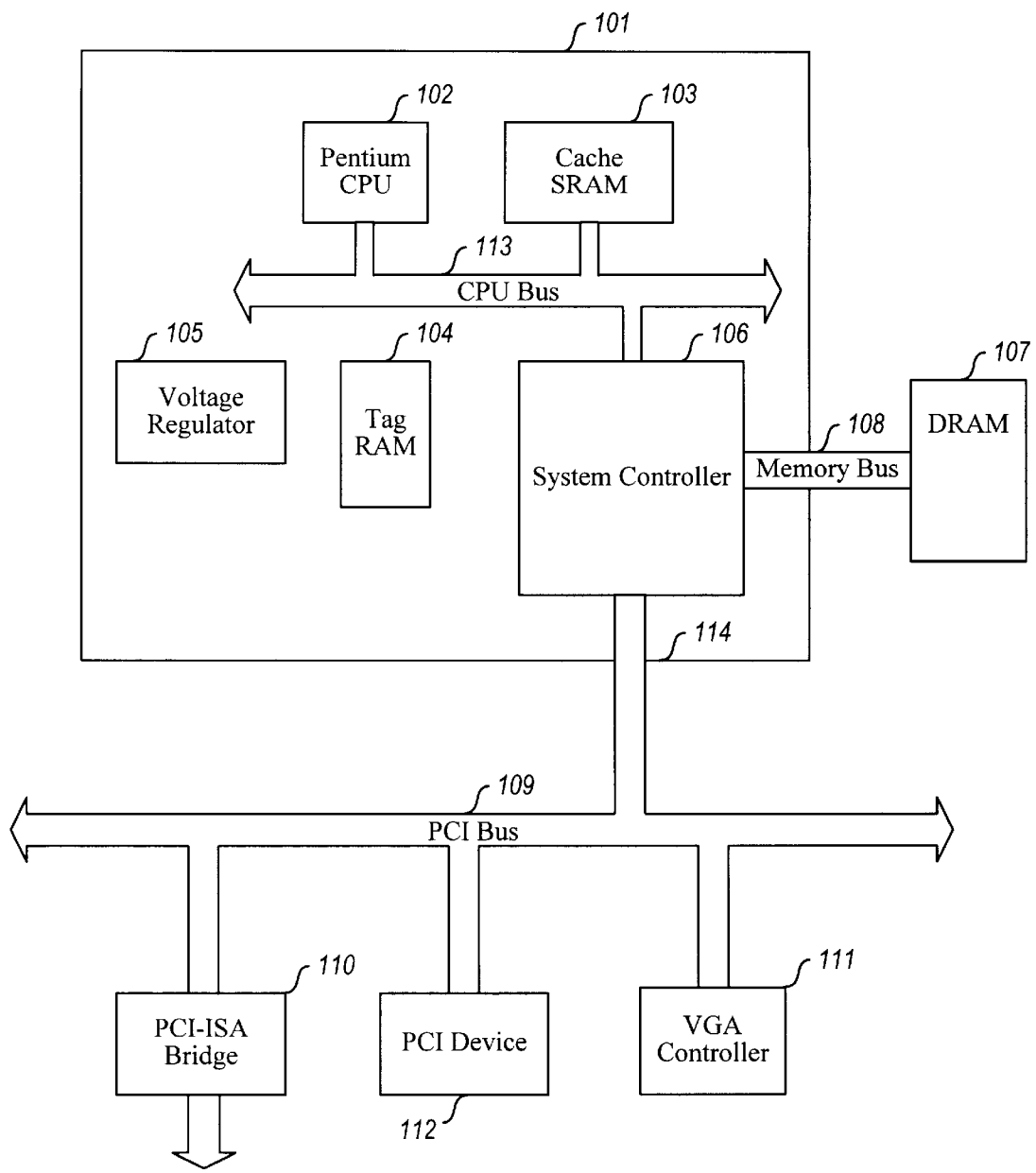
FIG. 1 is an architecture block diagram of an MPM produced by the Intel Corporation.

The present invention provides an upgradable MPM for use in a PC designed to be forward-compatible with the planned MDM-A MPM. Intel's currently-available MPM 101 shown in FIG. 1 contains sufficient connection pins for a single PCI port 114 from the MPM 101 to the PCI bus 109 through which the MPM 101 exchanges data and control sequences with other PCI-compatible devices. The planned MDM-A 201 shown in FIG. 2 contains additional pin connectors that allow the MDM-A 201 to connect both to a PCI bus 109, as well as to an AGP bus 211. The AGP bus 211 runs at a higher clock rate and is used to connect the system controller 205 with a VGA controller 111. As explained further below, an upgradable MPM that represents one embodiment of the current invention includes the components incorporated into the currently-available Intel MPM 101, but is connection-compatible with the planned MDM-A 201. This upgradable MPM can be used to build PCs that are forward-compatible with the planned MDM-A 201. In order to be plug compatible with future MPM devices, the upgradable MPM that represents one embodiment of the current invention includes additional pin connectors to support the AGP port and connects those pin connectors to the PCI port. Thus, in the upgradable MPM device, the system controller outputs PCI protocol to both the PCI port and to the AGP port.

Figure 2:
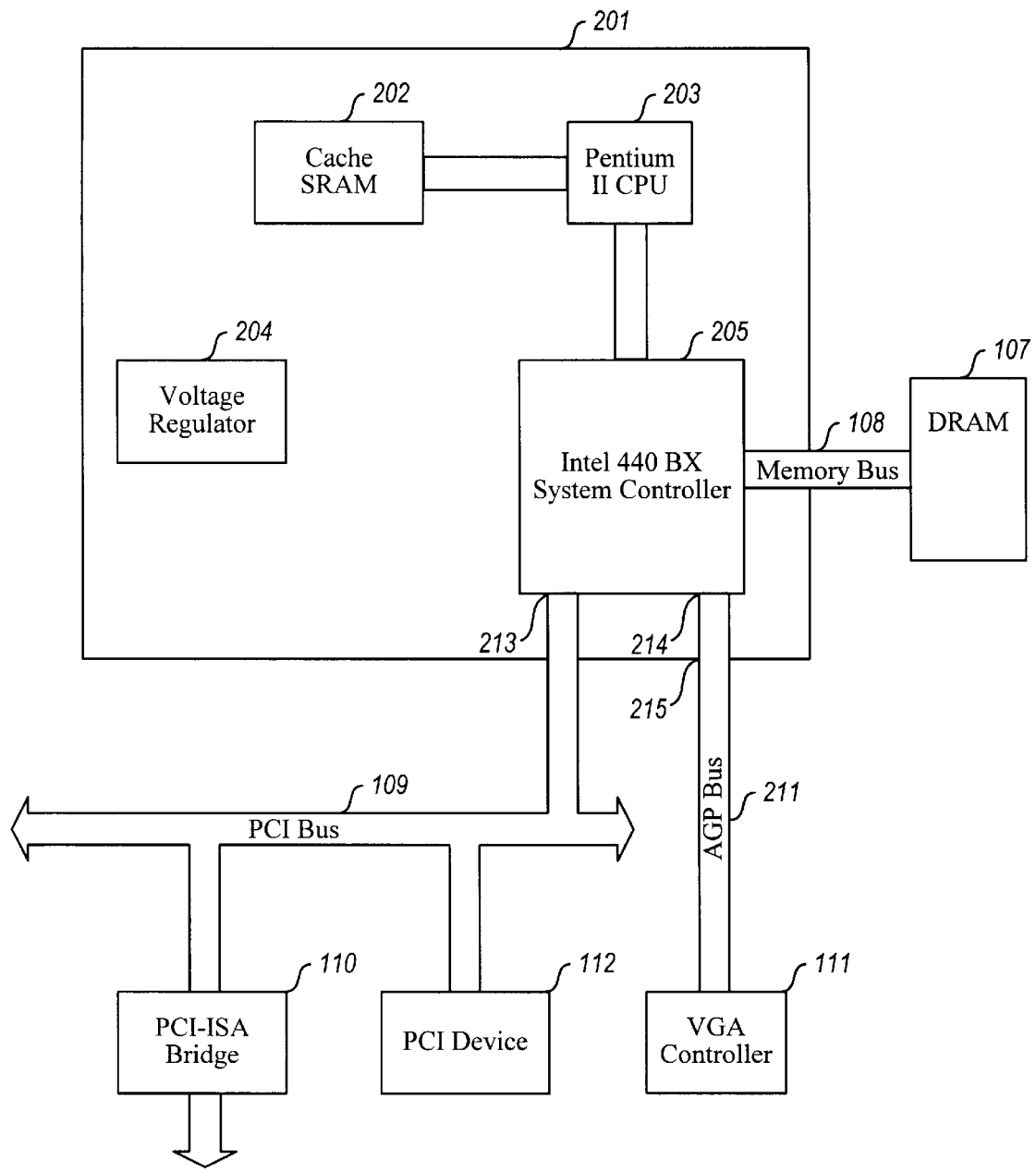
FIG. 2 is an architecture block diagram of the planned Intel MDM-A enhanced MPM.
Figure 3:
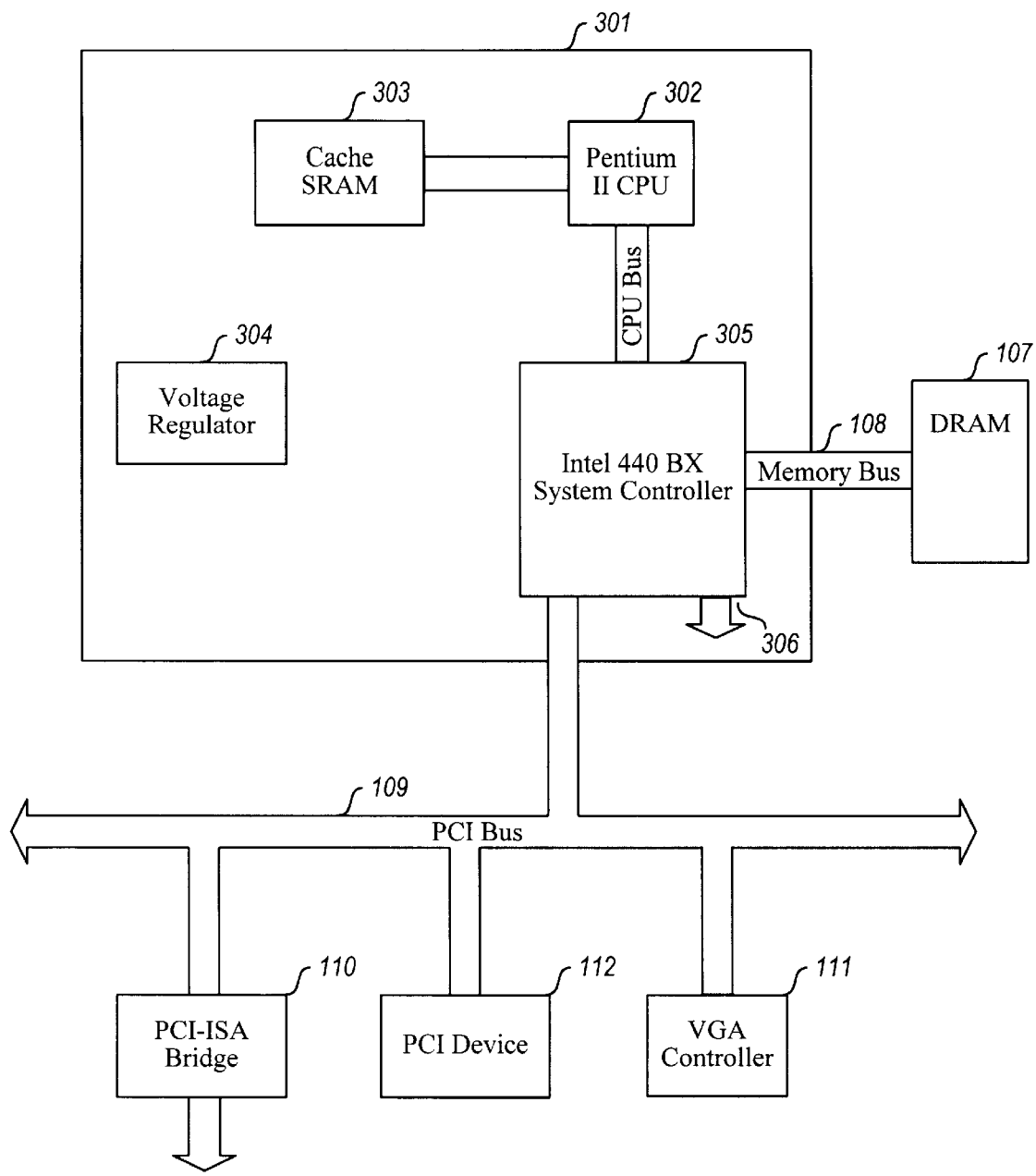
FIG. 3 is an architecture block diagram of a backward-compatible Pentium® II-based MPM.

It is relatively easy to develop a backward-compatible MPM that includes the internal components planned for use in the MDM-A 201. FIG. 3 is an architecture block diagram of a backward-compatible Pentium® II-based MPM. Many of the components shown in FIG. 3 are identical to components shown in FIG. 1. In the interest of brevity, those components of FIG. 2 that are identical to components in FIG. 1 have been provided with the same reference numerals as in FIG. 1, and an explanation of their operation will not be repeated. The backward-compatible MPM 301, like the MDM-A 201, includes a Pentium® II CPU 302, cache SRAM 303, voltage regulator 304, and an Intel 440BX system controller 305. An AGP port 306 of the system controller 305 is simply terminated on the board. As in the system architecture used for the currently-available MPM 101 shown in FIG. 1, the backward-compatible MPM 301 connects to external devices solely through the PCI bus 109. Thus, the system can take advantage of the increased processor performance of the Pentium® II CPU, but cannot take advantage of the potentially increased clock speeds that can be achieved by connecting the VGA controller 111 through the AGP port 214 that is available on the Intel 440BX system controller 205. Instead, the VGA controller 111, like the remaining PCI-compliant devices, exchanges data and control information with the system controller over the PCI bus 109. The backward-compatible MPM 301 shown in FIG. 3 can be used to upgrade older systems having the architecture displayed in FIG. 1, but cannot be used in systems built to be compatible with the MDM-A 201 shown in FIG. 2 because the backward-compatible MPM lacks the AGP bus pin connections and the 0.5 millimeter pitch connector planned for the MDM-A 201. Thus, using the backward-compatible MPM 301, an older Pentium®-based system can be upgraded to a Pentium® II CPU, but cannot take advantage of increased VGA bandwidth.

Figure 4:
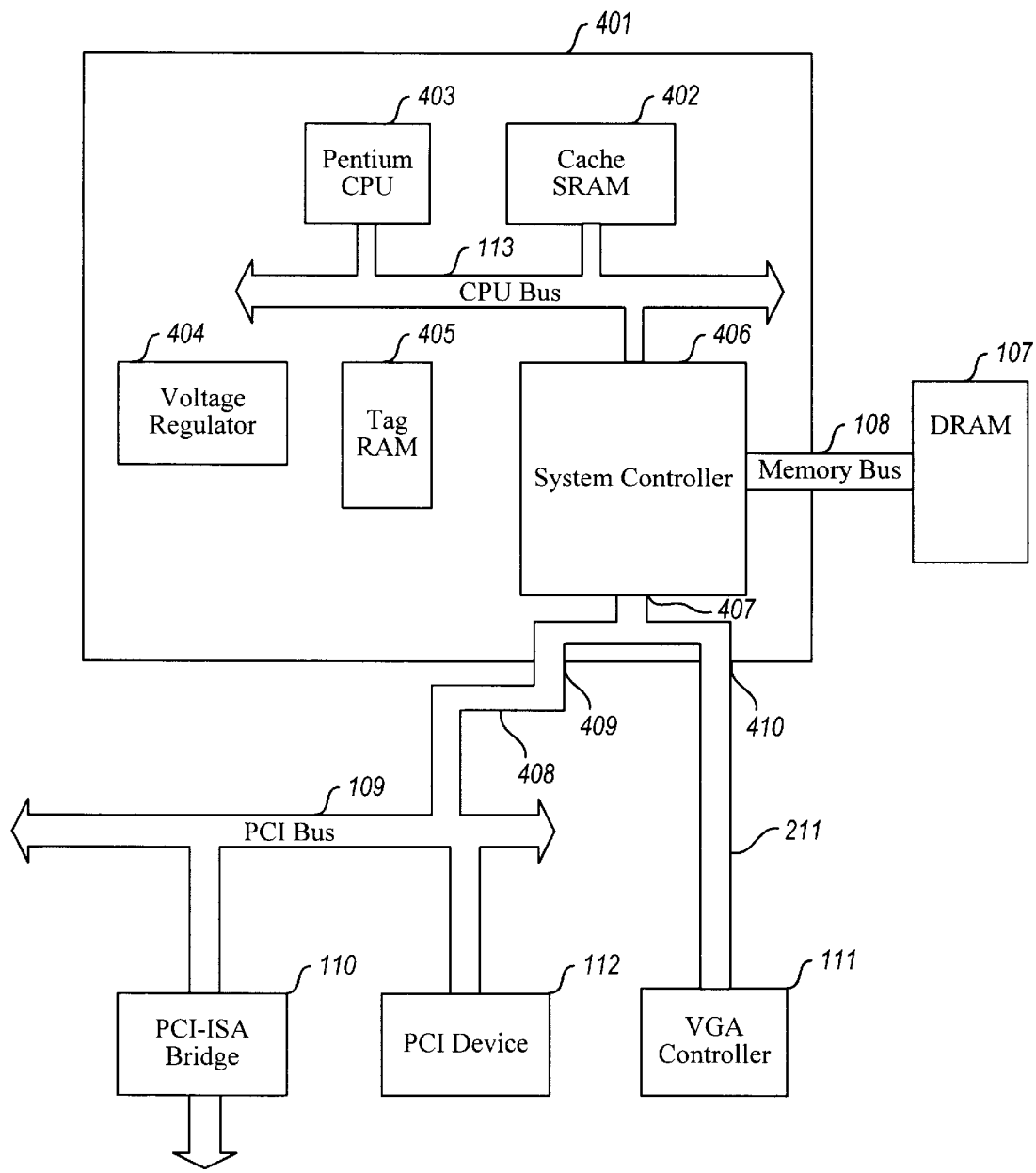
FIG. 4 is an architecture block diagram of a forward-compatible MPM device that incorporates components of the currently-available MPM displayed in FIG. 1.

FIG. 4 is an architecture block diagram of a forward-compatible MPM 401 that incorporates components of the currently-available MPM 101 shown in FIG. 1. As in the currently-available MPM 101, the forward-compatible MPM 401 includes a cache SRAM 402, a Pentium® CPU 403, a voltage regulator 404, a tag RAM 405, and a MCTX "North Bridge" system controller 406. As discussed above, this system controller 406 has a single PCI port 407 for connection to external devices through the PCI bus 109. However, in the forward-compatible, or upgradable, MPM 401, 0.5 millimeter pitch connection technology is employed that allows for pin connections for both the PCI bus 109 as well as for an AGP port 410. Thus, the upgradable MPM 401 is plug compatible with the MDM-A 201 in PCs designed for a separate AGP bus 211 connection between a VGA controller 111 and the system controller 406 on the MPM 401. The system controller 406 of the upgradable MPM 401 is, like the system controller 106 of the current MPM 101 shown in FIG. 1, connected through a single PCI port 407 to all of the PCI-compatible external devices 112, including the VGA controller 111. Because the AGP bus protocol is a superset of the PCI bus protocol, the system controller can exchange data using the PCI protocol with the VGA controller 111 at 33 MHz.

The AGP port 410 includes additional control lines that are not present on a PCI port. Pin connectors for those additional control lines are included in the upgradable MPM 401, but the AGP sideband signal will have no destination on the upgradable MPM 401. The sideband signals may be terminated on the upgradable MPM 401 to prevent floating conditions, or they may be coupled through resistors on the motherboard to an inactive logic level.

Although the present invention has been described in terms of one embodiment, it is not intended that the invention be limited to this embodiment. Modifications within the spirit of the invention will be apparent to those skilled in the art. For example, a variety of different controllers and devices can be employed as components both of the MPM devices and the external devices on the PC motherboard. The AGP bus may be run up to clock speeds of 133 MHz, and thus future systems with enhanced VGA controllers may achieve even higher video data transmission bandwidths. Forward compatibility may be accomplished, by similar techniques, for other planned future enhancements to MPM device connectivity and component technologies. The scope of the present invention is defined by the claims that follow.

What is claimed is:

1. An upgradable electronic module incorporating an internal component that has first-level capabilities and supports a first plurality of external connections through a first port of the internal components, the upgradable electronic module being forward-compatible with an enhanced electronic module incorporating at least one enhanced internal component that has the first-level capabilities and supports the first plurality of external connections through a first port of the internal component and that has a second-level capability and supports a second plurality of external connections through a second port of the internal component, the upgradable electronic module comprising:

an electronic module incorporating at least one internal component having the first-level capabilities but not the second-level capabilities, the electronic module supporting the first-level capabilities through a first port of the internal component; and a plurality of external connections including at least the first plurality of external connections and the second plurality of external connections, the external connections in the first and second pluralities being coupled to the first port of the internal component.

2. The upgradable electronic module of claim 1 wherein the internal component comprises a system controller, wherein the first port comprises a peripheral component interconnect port, wherein the first plurality of external connections are coupled to a peripheral component interconnect bus connected to the peripheral component interconnect port of the system controller through the first plurality of external connections, the upgradable electronic module also providing an external connection to an accelerated graphics processor bus through the second plurality of external connections, the external connection to an accelerated graphics processor bus being connected to the peripheral component interconnect port of the system controller.

3. The upgradable electronic module of claim 1 further comprising a processor having a first level of capabilities, and wherein the enhanced electronic module comprises a processor having a second level of capabilities, the second level being greater than the first level.

4. The upgradable electronic module of claim 1 further comprising a Pentium processor, wherein the enhanced electronic module comprises a Pentium II processor.

5. The upgradable electronic module of claim 2 further comprising a Pentium processor using 0.5 millimeter pitch connection technology, and wherein the enhanced electronic module comprises a Pentium II processor using 0.5 millimeter pitch connection technology.

6. An upgradable mobile processor module comprising a central processor unit that runs at a first speed and is forward-compatible with an enhanced mobile processor module having a peripheral component interconnect port, an accelerated graphics port and a central processing unit that runs at a second speed that is faster than the first speed, the enhanced mobile processor module having a system controller containing both a peripheral component interconnect port for connection to a peripheral component interconnect port of the enhanced mobile processor module and an accelerated graphics processor port for connection to an accelerated graphics processor port of the enhanced mobile processor module, the upgradable mobile processor module comprising:

a system controller that supports a single peripheral component interconnect port but lacks an accelerated graphics port;

a peripheral component interconnect port for connection to a peripheral component interconnect bus, the peripheral component interconnect port of the upgradable mobile processor module being coupled to the peripheral component interconnect port of the system controller; and an accelerated graphics processor port for connection to an accelerated graphics processor bus, the accelerated graphics processor port of the upgradable mobile processor module being electronically connected to the peripheral component interconnect port of the system controller so that both the accelerated graphics processor port and the peripheral component interconnect port receive data and control signals from the system controller according to a peripheral component interconnect protocol standard.

7. The upgradable mobile processor module of claim 6 further comprising a Pentium processor, and wherein the enhanced mobile processor module comprises a Pentium II processor.

8. The upgradable mobile processor module of claim 6 wherein the peripheral component interconnect port is adapted to connect the system controller to various external devices via the peripheral component interconnect bus and the accelerated graphics processor port is adapted to connect the system controller to a VGA controller via the accelerated graphics processor bus.

9. The upgradable mobile processor module of claim 8 wherein the various external devices connected to the system controller via the peripheral component interconnect bus run at a clock speed of 33 megahertz and the VGA controller connected to the system controller via the accelerated graphics processor port is adapted to run at a clock speed of either 33 megahertz or 66 megahertz.

10. An upgradable Pentium-based mobile processor module that is forward-compatible with an enhanced Pentium II-based mobile processor module that uses 0.5 millimeter pitch connection technology and that has both a peripheral component interconnect port for connection to a peripheral component interconnect bus and an accelerated graphics processor port for connection to an accelerated graphics processor bus, the upgradable Pentium-based mobile processor module comprising:

a Pentium-based mobile processor module that uses 0.5 millimeter pitch connection technology and that contains a system controller that supports a single peripheral component interconnect port;

a peripheral component interconnect port for connection to a peripheral component interconnect bus, the peripheral component interconnect port of the upgradable Pentium-based mobile processor module being coupled to the single peripheral component interconnect port of the system controller; and an accelerated graphics processor port for connection to an accelerated graphics processor bus, the accelerated graphics processor port of the upgradable Pentium-based mobile processor module being electronically connected to the peripheral component interconnect port of the system controller so that both the accelerated graphics processor port and the peripheral component interconnect port receive data and control signals from the system controller according to a peripheral component interconnect protocol standard.

11. The upgradable Pentium-based mobile processor module of claim 10 wherein the system controller is a MCTX North Bridge device.

12. A computer system comprising:

a PCI bus;

a PCI compatible computer component coupled to the PCI bus;

an AGP bus;

a video controller coupled to the AGP bus, and an upgradable electronic module comprising a processor and a system controller, the system controller having a processor port coupled to the processor and a PCI port, the upgradable electronic module further comprising a first externally accessible port coupled to the PCI port of the system controller and to the PCI bus of the computer system, the upgradable electronic module further comprising a second externally accessible port coupled to the PCI port of the system controller and to the AGP bus of the computer system.

* * * * *